United States Patent
Fischer

(10) Patent No.: US 11,707,865 B2
(45) Date of Patent: Jul. 25, 2023

(54) UNDERWATER PELLETIZER

(71) Applicant: Maag Automatik GmbH, Grossostheim (DE)

(72) Inventor: Florian Fischer, Ebersberg (DE)

(73) Assignee: MAAAG AUTOMATIK GMBH, Grossostheim (DE)

( * ) Notice: Subject to any disclaimer, the term of this patent is extended or adjusted under 35 U.S.C. 154(b) by 176 days.

(21) Appl. No.: 17/073,168

(22) Filed: Oct. 16, 2020

(65) Prior Publication Data

US 2021/0114260 A1 Apr. 22, 2021

(30) Foreign Application Priority Data

Oct. 18, 2019 (DE) .................. 10 2019 007 276.6

(51) Int. Cl.
*B29B 9/06* (2006.01)
*B29C 48/04* (2019.01)
*B29C 48/00* (2019.01)

(52) U.S. Cl.
CPC .......... *B29B 9/065* (2013.01); *B29C 48/0022* (2019.02); *B29C 48/04* (2019.02)

(58) Field of Classification Search
CPC ...... B29B 9/065; B29C 48/0022; B29C 48/04
See application file for complete search history.

(56) References Cited

U.S. PATENT DOCUMENTS

| | | | | |
|---|---|---|---|---|
| 2,286,405 A * | 6/1942 | Gordon | ............ | B29B 9/065 264/340 |
| 3,337,913 A * | 8/1967 | List | ............ | B29B 9/065 425/313 |
| 4,097,212 A * | 6/1978 | Morishima | ............ | B29B 9/065 425/313 |
| 5,814,350 A * | 9/1998 | Rockstedt | ............ | B29B 9/06 264/142 |
| 9,358,514 B2 | 6/2016 | Murb | | |
| 10,213,941 B2 | 2/2019 | Sommer | | |

FOREIGN PATENT DOCUMENTS

| | | |
|---|---|---|
| CA | 649814 A | 10/1962 |
| DE | 1014014 B | 8/1957 |
| DE | 2557166 A1 | 2/1977 |

(Continued)

OTHER PUBLICATIONS

Office Action from Japanese Application No. 2020-173965 dated Jun. 28, 2022.

(Continued)

*Primary Examiner* — Seyed Masoud Malekzadeh
(74) *Attorney, Agent, or Firm* — Troutman Pepper Hamilton Sanders LLP; Ryan A. Schneider; Korbin M. Blunck

(57) ABSTRACT

A cutting apparatus for use in an underwater pelletizer that has a nozzle head having a cutting surface that is rotationally symmetrical about a center axis of the nozzle head and in which nozzle openings are formed, has a drive shaft and at least one cutting head having cutting blades for cutting off melted plastic material exiting nozzle openings of a nozzle head and formed in strand shape, in the form of pellets, wherein the cutting head has a mechanism so the cutting blades can be simultaneously adjusted relative to the cutting surface.

11 Claims, 3 Drawing Sheets

(56) References Cited

FOREIGN PATENT DOCUMENTS

| | | |
|---|---|---|
| DE | 4419786 C1 | 12/1995 |
| EP | 2861397 B1 | 10/2016 |
| EP | 3062978 B1 | 12/2018 |
| FR | 1148154 A | 12/1957 |
| GB | 1100841 A | 1/1968 |
| JP | 54073850 A | 6/1979 |
| JP | 60-044307 A | 3/1985 |
| JP | 09-207130 A | 8/1994 |
| JP | 2012-066387 A | 4/2012 |

OTHER PUBLICATIONS

Office Action from Austrian Application No. A 50892/2020 dated May 6, 2022.

* cited by examiner

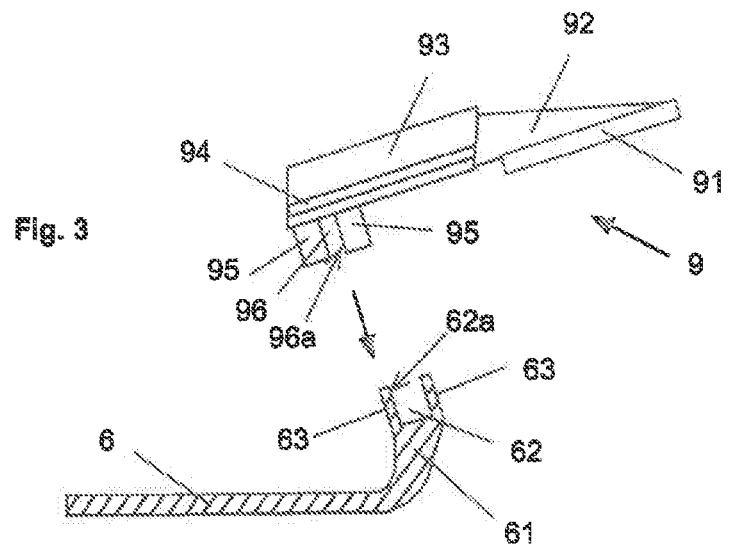
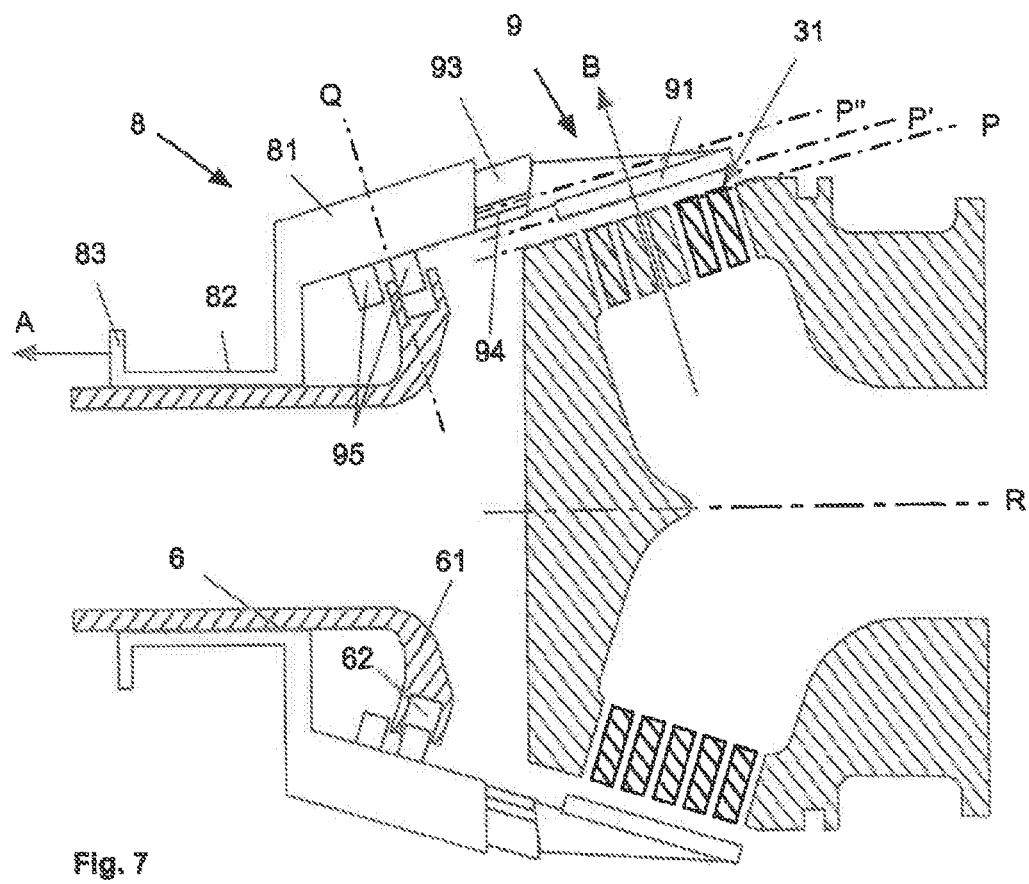

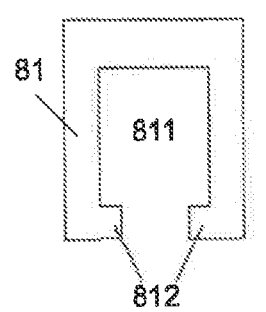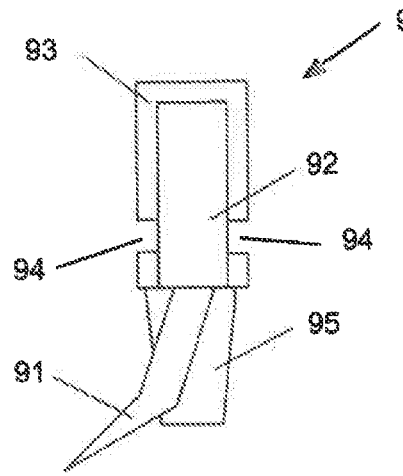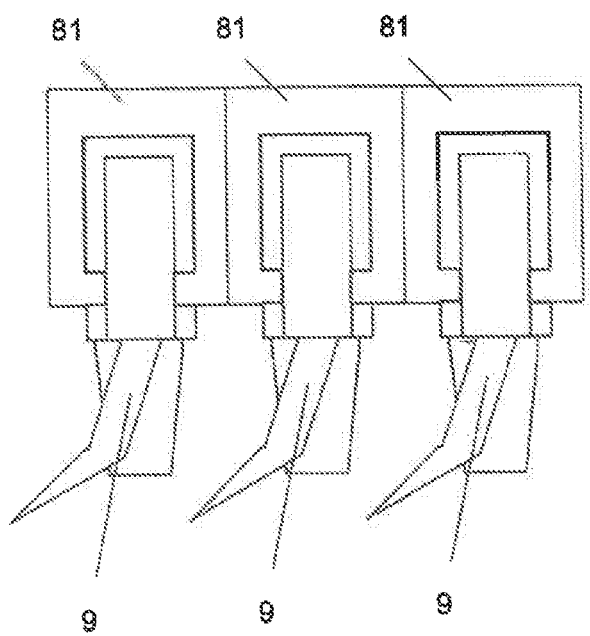

UNDERWATER PELLETIZER

CROSS-REFERENCE TO RELATED APPLICATIONS

This application claims the benefit of DE 10 2019 007 276.6 filed 18 Oct. 2019, the entire contents and substance of which are hereby incorporated by reference as if fully set forth below.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

SEQUENCE LISTING

Not Applicable

STATEMENT REGARDING PRIOR DISCLOSURES BY THE INVENTOR OR A JOINT INVENTOR

Not Applicable

BACKGROUND OF THE DISCLOSURE

1. Field of the Disclosure

The invention relates to an underwater pelletizer for pelletizing thermoplastic material.

2. Background

Pelletizing apparatuses in which extruded, molten plastic material is shaped to form strands in a nozzle head are in general frequently used for the pelletization of thermoplastic material, in particular polymers such as polyethylene or polypropylene. This is typically done in that the hot material that is in a molten state is pressed through nozzles of a nozzle arrangement formed as a perforated plate into a cooling fluid, for example water, that is in a cutting chamber. A blade arrangement is located in the cutting chamber and has blades that sweep over the openings of the perforated plate and cut off the material strands so that pellets are formed. Corresponding pelletizing apparatus are known, for example, from EP 2 861 397 B1 and from EP 3 062 978 B1.

This design principle has proven itself multiple times in practice and in particular enables a generally simple scaling so that "large" pelletizers for high and very high throughput rates can also be implemented. It is, however, disadvantageous here that the perforated plate also has to be scaled accordingly for large throughput rate volumes and has to be formed with a correspondingly larger diameter. In practice, this means that a perforated plate can have a diameter of more than 1 m for a pelletizer having a throughput rate of several metric tons (tonnes) per hour. Such large perforated plates can usually only be produced in a very complex and cost-intensive manner.

All the further assemblies of such a pelletizer also have to be dimensioned correspondingly large, which results in a very large construction volume and high costs. Due to the large diameter and associated with this the high weight of such a perforated plate, a replacement thereof that is required as a rule is furthermore only possible with a great effort and correspondingly long downtimes of the pelletizer, which considerably increases service costs. One particular problem in this respect is due to the fact that the blade arrangement has to be aligned with high precision in a complex manner after completed service work since due to the large diameter of the perforated plate and associated with this also of the blade arrangement, even very small axial alignment errors can result in damage.

A die face pelletizer is furthermore known from document DE 44 19 786 C1 having a cylindrical housing to whose inner space plastic melt is supplied that, pressed out through passages radially penetrating the housing wall and through blades rotating in a substantially water-free space that slide over the openings of the passages along a cutting surface running around the housing wall is cut into pellets. The blades are driven by a rotor and are rotatably supported on blade axles, with the cutting edges being pressed against the housing wall by helical springs.

With the design of DE 44 19 786 C1, it has to be assumed that as the speed of the rotor increases, an increasingly powerful centrifugal force acts on the centers of gravity of the blades (that do not coincide with the blade axles) so that an additional torque results that is dependent on the rotor speed and by which the cutting edges are additionally pressed against the housing wall. A scaling of the design presented in this document to large throughput rates with a high pelletization quality appears less promising.

It is also not provided in DE 44 19 786 C1 to be able to raise the blades from the cutting surface as would, however, be desirable for underwater pelletization.

It is therefore an object of the present invention to overcome the above disadvantages and to provide an improved underwater pelletizer that enables a high throughput rate at lower plant costs and a reduced servicing effort. It is a further object of the present invention to provide an improved underwater pelletizer that enables a high throughput rate with a reduced construction volume.

BRIEF SUMMARY OF THE DISCLOSURE

These and other objects are achieved by a cutting apparatus for an underwater pelletizer that has a nozzle head having a cutting surface that is rotationally symmetrical about a center axis of the nozzle head and in which nozzle openings are formed, wherein the cutting apparatus has a drive shaft and at least one cutting head having a plurality of cutting blades for cutting off melted plastic material exiting nozzle openings of a nozzle head and formed in strand shape, in the form of pellets, wherein the cutting head has a mechanism by means of which the plurality of cutting blades can be simultaneously adjusted relative to the cutting surface by actuating an actuation element in a respective direction of movement that includes a movement component in a radial direction perpendicular to the center axis and a movement component in an axial direction in parallel with the center axis.

These and other objects are achieved by an underwater pelletizer comprising a nozzle head having a cutting surface that is rotationally symmetrical about a center axis of the nozzle head and in which nozzle openings are formed, and a cutting apparatus, for example, like that described above.

In one aspect, a cutting apparatus for use in an underwater pelletizer is provided that has a nozzle head having a cutting surface, in particular a cutting surface formed in a conical, frustoconical, cylindrical or cap-shaped manner, that is rotationally symmetrical about a center axis of the nozzle head, and in which nozzle openings are formed, with the cutting device having a drive shaft and at least one cutting head with a plurality of cutting blades for cutting off molten plastic material in the form of pellets that exits nozzle openings of a nozzle head and is shaped in strand from, and with the cutting head having a mechanism by means of which the plurality of cutting blades can be adjusted simultaneously relative to the cutting surface by actuation an actuation element in a respective direction of movement that includes a movement component perpendicular to the center axis in a radial direction and a movement component in parallel with the center axis in an axial direction.

In a further aspect, an underwater pelletizer is provided that has a nozzle head having a cutting surface that is rotationally symmetrical about a center axis of the nozzle head and in which nozzle openings are formed, and that has the cutting apparatus.

It is proposed by the invention to use a nozzle head for an underwater pelletizer having a rotationally symmetrical, for example frustoconical, cutting surface. A cutting surface can be provided in this manner that has a large area and in which a correspondingly large number of nozzles can be provided that permits a correspondingly large throughput rate of pelletization, while the maximum diameter of such a nozzle head is at the same time substantially reduced in size in comparison with a perforated plate of conventional construction.

The use of such a non-planar three-dimensional nozzle head in an underwater pelletizer, however, simultaneously provides new challenges with respect to the cutting apparatus. It is thus necessary on the start of the underwater pelletization to fill the nozzles with melt, which procedure takes place with an open cutting chamber. It is accordingly necessary to move away the cutting blades that interfere in this process and to "park" them elsewhere. In the case of conventional underwater pelletizers, this can take place simply in that the cutting head is traveled away from the perforated plate and the cutting blades are thus also moved away from the cutting surface in the axial direction. With a non-planar, three-dimensional nozzle head, in contrast, such a solely axial movement of the cutting blade would not be possible or would only be possible with difficulty in dependence on the geometry. It is therefore proposed in accordance with the invention to configure the cutting device such that the cutting blades can be simultaneously traveled axially and radially so that a simple and safe adjustment of the cutting blades relative to the cutting surface can take place.

Provision can in particular be made here that the direction of movement is a direction of a surface normal on the cutting surface at the location of a cutter of a respective cutting blade. In other words, the cutting blades are adjusted such that they each move perpendicular to the cutting surface and are not, for instance, drawn or pushed along the cutting edge transversely to the cutting surface.

The cutting head can advantageously have a blade support ring in which a plurality of cutting blade mount sections are defined, with a cutout in which a respective cutting blade can be inserted being defined in each of the cutting blade mount sections, with at least one guide web that is formed in the cutting blade mount section and in a handle section of the cutting blade engaging into a guide groove that is formed in the other one of the cutting blade mount sections and a handle section of the cutting blade to guide a movement of the pushing/pulling of the cutting blade into/out of the cutout, with the guide web and the guide groove being defined by a straight line that increasingly moves away from the center axis in the direction of the nozzle head.

The blade support ring can further preferably be displaceably arranged in the axial direction on the drive shaft and means can be provided that engage at the individual cutting blades and that have the effect that on a displacement of the blade support ring in the axial direction, the cutting blades are held back so that, when the blade support ring is displaced in the axial direction on the drive shaft, the cutting blades are pulled out or pushed into the respective associated cutting blade mount section, with these means in particular being able to define the direction of movement of the cutting blades.

The means that engage at the individual cutting blades and that have the effect that on a displacement of the blade support ring in the axial direction, the cutting blades are held back, can comprise at least one projection that is formed at the handle section of a respective cutting blade that engages in the cutout that is formed in an end section of the drive shaft or that is formed in an element that is fixedly connected to the drive shaft.

A mechanism that also permits the adjustment of the cutters in the axial direction can be implemented in a constructionally simple and simultaneously operationally safe manner by the aforesaid measures, individually or in combination.

The drive shaft can advantageously be formed as a hollow shaft, with a supply of process water into a cutting chamber of the underwater pelletizer taking place through the hollow shaft.

These and other objects, features and advantages of the present disclosure will become more apparent upon reading the following specification in conjunction with the accompanying description, claims and drawings.

BRIEF DESCRIPTION OF THE DRAWINGS

The accompanying Figures, which are incorporated in and constitute a part of this specification, illustrate several aspects described below.

FIG. 3 shows details of a cutting blade and of an end section of the hollow shaft of FIG. 2.

FIG. 4 shows, in a schematic front view, a cutting blade mount section.

FIG. 5 shows, a cutting blade in a schematic front view.

FIG. 6 shows, in a schematic front view, cutting blades that are received in respective cutting blade mount sections.

FIG. 7 shows, in a schematic sectional view, the nozzle head and the cutting head of FIG. 3 in a state in which the cutting blades of the cutting head are raised from the cutting surface of the cutting head.

DETAILED DESCRIPTION OF THE DISCLOSURE

Figure 1:
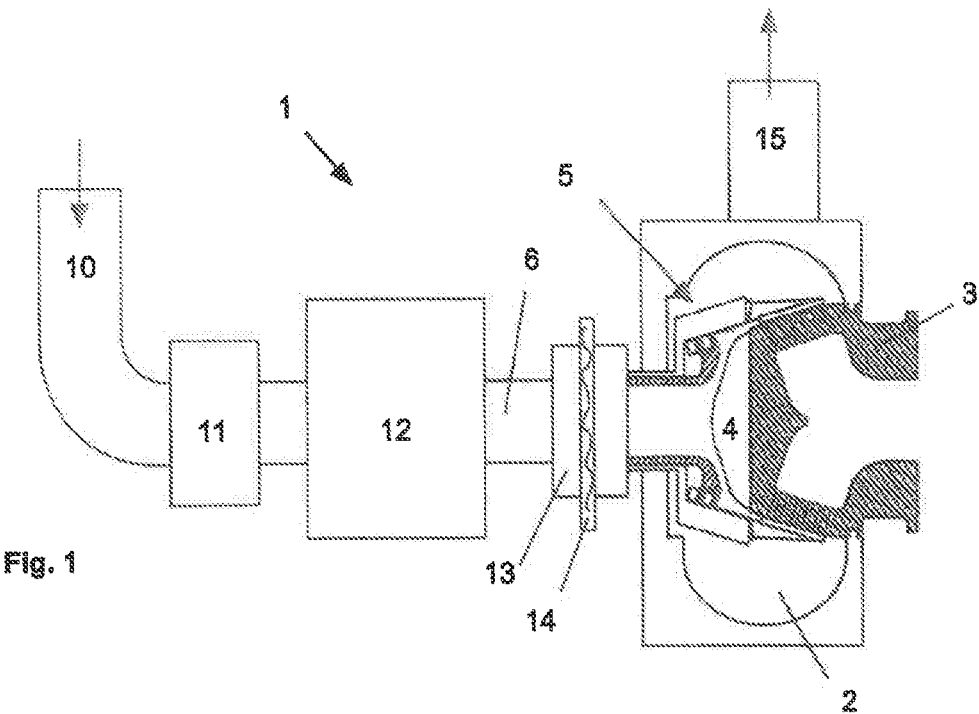
FIG. 1 schematically shows an underwater pelletizer in accordance with an embodiment of the invention.

Although preferred exemplary embodiments of the disclosure are explained in detail, it is to be understood that other exemplary embodiments are contemplated. Accordingly, it is not intended that the disclosure is limited in its scope to the details of construction and arrangement of components set forth in the following description or illustrated in the drawings. The disclosure is capable of other exemplary embodiments and of being practiced or carried out in various ways. Also, in describing the preferred exemplary embodiments, specific terminology will be resorted to for the sake of clarity.

As used in the specification and the appended claims, the singular forms "a," "an" and "the" include plural referents unless the context clearly dictates otherwise.

Also, in describing the preferred exemplary embodiments, terminology will be resorted to for the sake of clarity. It is intended that each term contemplates its broadest meaning as understood by those skilled in the art and includes all technical equivalents which operate in a similar manner to accomplish a similar purpose.

Ranges can be expressed herein as from "about" or "approximately" one particular value and/or to "about" or "approximately" another particular value. When such a range is expressed, another exemplary embodiment includes from the one particular value and/or to the other particular value.

Using "comprising" or "including" or like terms means that at least the named compound, element, particle, or method step is present in the composition or article or method, but does not exclude the presence of other compounds, materials, particles, method steps, even if the other such compounds, material, particles, method steps have the same function as what is named.

Mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

FIG. 1 schematically shows an underwater pelletizer in accordance with an embodiment of the invention. As shown, the underwater pelletizer 1 has a cutting chamber 2 in which a nozzle head 3 and a cutting head 5 are arranged. The cutting head 5 is driven by a rotary drive 12 via a hollow shaft 6 supported in a bearing 13. The rotary drive 12 is advantageously designed as a direct electromotive drive, with the hollow shaft 6 extending through the motor stator and being driven by it. The hollow shaft 6 simultaneously serves the supply of process water into the cutting chamber 2. The hollow shaft 6 is connected for this purpose to a process water supply pipe 10 via a rotary union 11. The process water with the pellets contained therein are led off from the cutting chamber 2 via a process water return pipe 15.

The design and configuration of the nozzle head 3 and of the cutting head 5 will be described in more detail with reference to FIG. 2.

Figure 2:
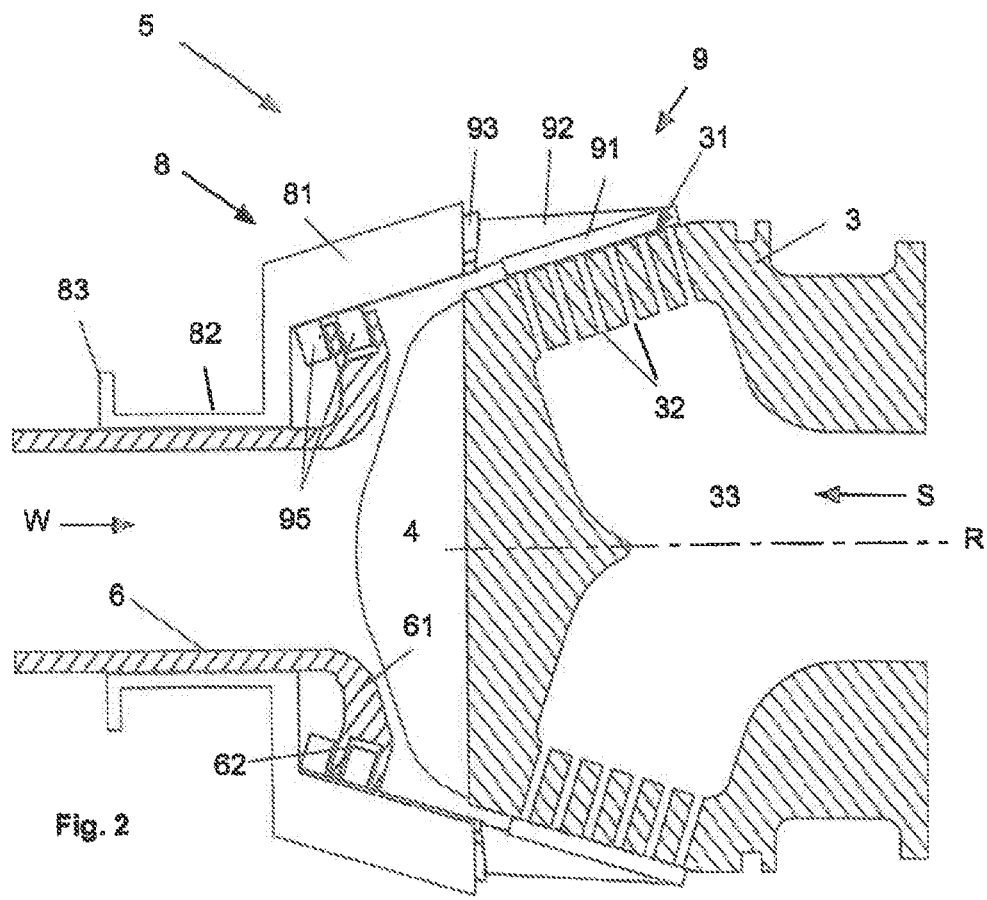
FIG. 2 shows, in a schematic sectional view, a nozzle head and a cutting head of the underwater pelletizer of FIG. 1 in greater detail in a state in which cutting blades of the cutting head contact a cutting surface of the cutting head.

As shown in FIG. 2, the nozzle head 3 is formed as a three-dimensional rotary body having a center axis M that likewise defines a longitudinal axis of the nozzle head and has a plurality of nozzles 32 that are formed in a conically shaped region of the nozzle head 3 that is here called a cutting surface 31. The nozzle head 3 furthermore has an inner hollow space 33 to which plastic material is supplied as a melt S from where the melt S exits the nozzle head 3 via the nozzles 32.

The cutting head 5 is formed by a blade support ring 8 in which a plurality of cutting blades 9 are held. More precisely, each cutting blade 9 has a cutter section 92 to which a cutter 91 is fastened and a handle section 93 that is received and held in a cutting blade mount section 81.

The blade support ring 8 furthermore has a shaft connection section 82 that Is formed concentrically with the hollow shaft 8 and via which the blade support ring 8 is connected to the hollow shaft 6 in a manner to transfer a rotary movement of the hollow shaft 6 to the blade carrier 8. The connection is formed here such that it permits a displacement of the blade carrier 8 on the hollow shaft 6 in the axial direction. To affect a displacement of the blade carrier 8, the blade support ring 8 furthermore has an actuation section 83 that can, for example, be connected to a fork 14 (see FIG. 1) to affect the displacement.

In an operating state of the underwater pelletizer 1 shown in FIG. 2, the rotary movement of the hollow shaft 6 can thus be transferred to the blade support ring 8 so that the cutters 91 of the cutting blades 9 held by the blade support ring 8 sweep over the conical cutting surface 31 and cut off and pelletize the strand-shaped melt material exiting the nozzles 31.

Process water is simultaneously supplied to the cutting chamber 2 via the hollow shaft 6. The end section 61 can here preferably be formed as a widening cone. The nozzle head 3 can furthermore be formed as likewise conical at its front axial end or, when the nozzle head 3 has a planar surface at its front axial end as in the embodiment shown in FIG. 2, an insulating cone 4 can be provided so that the end section 61 and the insulating cone 4 cooperate to conduct process water entering from the hollow shaft 5 directly toward the cutting surface 31 and toward the cutting blades 9.

FIG. 2 further shows that the end section 61 is furthermore configured to form a cutout 62 in which a projection 95 formed at the handle section 93 of a respective cutting blade 9 can engage, as explained in more detail with respect to FIG. 3.

FIG. 3 shows a cutting blade 9 in a schematic side view. As already explained with reference to FIG. 2, the cutting blade 9 has a handle section 93 and a cutter section 92 to which a cutter 91 is fastened. Guide grooves 94 are formed at both sides in the handle section 93. Two projections 95 are furthermore formed at the handle section 93 that extend in the direction toward the end section 61, with a cutout 96 being formed between the two projections 95 that is laterally bounded by planar contact surfaces 62a.

FIG. 3 furthermore shows the end section 61 of the hollow shaft 6 in which the cutout 62 is formed that is bounded and defined in the lateral direction by two webs 63.

As symbolized by the arrow in FIG. 3, provision is made in this respect that one of the webs 63 engages into the cutout 96 and one of the projections 95 simultaneously engages into the cutout 62. In interaction of the projections 95 and webs 63, a kind of linear guidance is formed in this manner in which the projection 95 and the web 62 can move relative to one another in a first direction that is defined by the direction of extent of the planar contact surfaces 96a and 62a respectively formed at the projection 95 and the web 62 and a movement in a direction perpendicular to the contact surfaces 96a and 62a respectively is prevented.

The mounting of the cutting blades 9 in the cutting blade mount sections 81 will be described with reference to FIGS. 4 to 6. FIG. 4 shows a cutting blade mount section 81 in a schematic front view. The cutting blade mount section 81 has a cutout 811 that is open toward the bottom while forming guide webs 812. The opening 811 is dimensioned such that the handle section 93 of the cutting blade 9 can be pushed from the front into the opening 811, with the guide webs 812 engaging in the guide grooves 94 laterally formed in the handle section 93 of the cutting blade 9 (see FIG. 5).

FIG. 6 schematically shows a plurality of cutting blade mount section 81 into which a respective one cutting blade 9 is inserted. It must be noted here that even if the cutting blade mount sections 81 are shown arranged in a straight line in FIG. 6 for a simpler understanding, they lie on an arc of a circle in practice to form the blade support ring 8.

The axial displaceability of the blade support ring 8 explained above forms in combination with the linear guide explained likewise explained above by the projections and by the webs 63, and the guide webs 812 that engage in the guide grooves 94 effect in combination a mechanism by which the cutting blades 9 can be adjusted in a radial direction, relative to the center axis M, away from the cutting surface 31 and toward the cutting surface 31 or in a direction that includes a radial component, as will be described in more detail with respect to FIG. 7.

The case is shown in FIG. 7 that the actuation section 83 is actuated in a manner to displace the blade support ring 8 on the hollow shaft 6 in the axial direction such that it is moved away from the nozzle head 6. Since the projection 95 of the cutting blades engaging in the opening 62 come into abutment against the web 63 that is introduced between the projections 95 into the opening 96 formed there, the cutting blades 9 are prevented from following this movement of the blade support ring 9 so that the cutting blades 9 are pulled out of the cutout 911 in the cutting blade mount sections 81. At the same time, the guide webs 812 in the cutting blade mount sections 81 are not aligned in parallel with the center axis M, but are rather at an angle thereto so that the guide webs 812 define a gradient that increases in the direction toward the nozzle head 3, that is a straight line extending through the guide grooves 812 increasingly moves away in the direction toward the nozzle head 3. If the blade support head 8 is now moved away from the nozzle head 3, the gradient of the guide grooves 812 has the effect that the cutting blades 9 held by the web 62 are moved in a direction away from the center axis M toward the outside and the cutters 91 are thus raised from the cutting surface 31, as indicated by the arrow B that shows the direction of movement of the cutter 91 or of the cutting blade 9 overall.

This direction of movement B is here defined by the interaction of the projections 95 and webs 62 forming a kind of linear guide and is defined more exactly by the direction Q along which the contact surfaces 96a and 62a extend away from the center axis M. If the direction of extent Q were to be, for example, at 90° perpendicular to the center axis M, the direction of movement of the cutter 91 or of the cutting blade 9 would also be a direction perpendicular to the center axis M. However, it is preferred that the cutting blades 9 or their cutters 91 are raised in a direction that simultaneously faces radially away from the center axis M and axially away from the nozzle head 3. It is particularly preferred here, as shown in the case of FIG. 7, that the cutting blades 9 or their cutters 91 are each raised in a direction from the cutting surface 31 that forms a surface normal on the cutting surface 31, that is every cutter 31 is moved from the cutting surface 31 in a direction that is perpendicular to the cutting surface 31 at the location of the cutter 91. It must, however, be noted that the cutter 31 is also respectively moved away from the cutting surface 31 for different directions of movement B such that the cutter 91 remains in parallel with the cutting surface 31, as shown by the straight line P extending through the cutting surface 31 and the straight line P' parallel therewith and extending through the cutter 91.

Whereas the case is shown in FIG. 7 that the cutting blades 9 are raised from the cutting surface 31 and are adjusted away therefrom in that the blade support ring 8 on the hollow shaft 6 is moved in an axial direction away from the nozzle head 3, an adjustment of the cutting blades 9 in the direction toward the cutting surface can be effected, as will easily be understood, in that the blade support ring 8 on the hollow shaft 6 is moved in the axial direction toward the nozzle head 3 so that the cutting blades 9 are pushed into the cutting blade mount sections 81 and move the cutting blade along a direction of movement that is opposed to the direction of movement B of FIG. 7 the cutters 91 toward the cutting surface 31 due to the effect of the projections 95 and webs 62 forming a kind of linear guide.

It is to be understood that the exemplary embodiments and claims disclosed herein are not limited in their application to the details of construction and arrangement of the components set forth in the description and illustrated in the drawings. Rather, the description and the drawings provide examples of the exemplary embodiments envisioned. The exemplary embodiments and claims disclosed herein are further capable of other exemplary embodiments and of being practiced and carried out in various ways. Also, it is to be understood that the phraseology and terminology employed herein are for the purposes of description and should not be regarded as limiting the claims.

Accordingly, those skilled in the art will appreciate that the conception upon which the application and claims are based can be readily utilized as a basis for the design of other structures, methods, and systems for carrying out the several purposes of the exemplary embodiments and claims presented in this application. It is important, therefore, that the claims be regarded as including such equivalent constructions.

I claim:

1. A cutting apparatus for use in an underwater comprising:
    a drive shaft;
    a cutting head comprising a blade support ring displaceably supporting a plurality of cutting blades;
        wherein the drive shaft is configured to transfer a rotary movement to the blade support ring so the cutting blades cut off melted plastic material exiting nozzle openings formed in a nozzle head of the underwater pelletizer, wherein the nozzle head has a cutting surface that is rotationally symmetrical about a center axis of the nozzle head; and
        wherein the blade support ring is displaceable in an axial direction that is parallel to the center axis of the nozzle head; and
    a cutting blades adjustment mechanism to transform axial displacement of the blade support ring in the axial direction into radial displacement of the cutting blades via a respective direction of movement that is a direction of a surface normal on the cutting surface of the nozzle head, the cutting blades adjustment mechanism comprising linear guides inclined at an angle relative to the center axis of the nozzle head;
        wherein the cutting blades of the cutting head are displaceably supported on the blade support ring along the linear guides; and
        wherein the cutting blades adjustment mechanism is configured to simultaneously bring each of the cutting blades into a radial position relative to, and in parallel with, the cutting surface of the nozzle head when the blade support ring is axially displaced in the axial direction.

2. The cutting apparatus in accordance with claim 1, wherein each cutting blade has a cutter section to which a cutter is fastened; and wherein the respective direction of movement is the direction of the surface normal on the cutting surface of the nozzle head at a location of the cutter of each respective cutting blade.

3. The cutting apparatus in accordance with claim 1, wherein the blade support ring has a plurality of cutting blade mount sections, each comprising:
   a first cutout cooperatively shaped for a handle section of a respective cutting blade that is received and held in the respective cutting blade mount section; and
   a guide web engageable with one or more guide grooves formed in the handle section of the respective cutting blade;
   wherein each cutting blade further has a cutter section to which a cutter is fastened; and
   wherein the first cutout, the guide web, and one or more guide grooves guide a movement of a pushing/pulling of each respective cutting blade into/out of the first cutout, with the guide web and the one or more guide grooves being defined by a straight line that increasingly moves away from the center axis of the nozzle head.

4. The cutting apparatus in accordance with claim 3, wherein the cutting blades adjustment mechanism further comprises an actuation section of the blade support ring that forms an engagement point for displacing the blade support ring; and
   wherein the linear guides are further configured that on the axial displacement of the blade support ring in the axial direction, the cutting blades are held back so that, when the blade support ring is displaced in the axial direction, each of the cutting blades are pulled out of or pushed into each of the respectively associated cutting blade mount sections.

5. The cutting apparatus in accordance with claim 4, wherein the linear guides define the respective direction of movement.

6. The cutting apparatus in accordance with claim 5, wherein the linear guides each comprise at least one projection that is formed at the handle section of each of the respective cutting blades that engages in a second cutout that is formed in an end section of the drive shaft or that is formed in an element that is fixedly connected to the drive shaft.

7. The cutting apparatus in accordance with claim 1 further comprising:
   the nozzle head;
   wherein at least one cutting blade of the cutting head comprises a cutter; and
   wherein the respective direction of movement is the direction of the surface normal on the cutting surface of the nozzle head at a location of the cutter of the at least one cutting blade.

8. The cutting apparatus in accordance with claim 7, wherein the blade support ring has a first and a second cutting blade mount section defined therein, each of the cutting blade mount sections comprising a first cutout configured such that each respective cutting blade is received and held in each of the respective cutting blade mount sections; and
   wherein the first cutting blade mount section has at least one guide web and a first handle section of each respective cutting blade engages a guide groove formed in the second cutting blade mount section and in a second handle section of the respective cutting blade to guide a movement of a pushing/pulling of each respective cutting blade into/out of the first cutout, with the guide web and the guide groove defined by a straight line that increasingly moves away from the center axis of the nozzle head.

9. The cutting apparatus in accordance with claim 8, wherein the cutting blades adjustment mechanism further comprises an actuation section of the blade support ring that forms an engagement point for displacing the blade support ring; and
   wherein the linear guides are further configured that on the axial displacement of the blade support ring in the axial direction, the cutting blades are held back so that, when the blade support ring is displaced in the axial direction, each of the cutting blades are pulled out of or pushed into each of the respectively associated cutting blade mount sections.

10. The cutting apparatus in accordance with claim 9, wherein the linear guides define the respective direction of movement.

11. The cutting apparatus in accordance with claim 10, wherein the linear guides each comprise a projection that is formed at the handle section of each respective cutting blade that engages in a second cutout that is formed in one of:
   an end section of the drive shaft; or
   an element that is fixedly connected to the drive shaft.

* * * * *